(12) United States Patent
Willey

(10) Patent No.: US 8,616,507 B2
(45) Date of Patent: Dec. 31, 2013

(54) PANEL MOUNTING ASSEMBLY

(76) Inventor: Barry A. Willey, Inverness, IL (US)

(*) Notice: Subject to any disclaimer, the term of this patent is extended or adjusted under 35 U.S.C. 154(b) by 238 days.

(21) Appl. No.: 12/893,671

(22) Filed: Sep. 29, 2010

(65) Prior Publication Data
US 2012/0074282 A1  Mar. 29, 2012

(51) Int. Cl.
*F16L 3/08* (2006.01)
(52) U.S. Cl.
USPC ..... 248/74.2; 248/74.3; 248/74.1; 248/218.4; 24/279
(58) Field of Classification Search
USPC ........... 248/74.3, 74.1, 74.2, 218.4, 230.1, 248/230.8, 231.81, 230.7, 316.7, 693, 689, 248/228.8, 228.7; 296/78.1, 96.21; 24/279, 24/20 LS
See application file for complete search history.

(56) References Cited

U.S. PATENT DOCUMENTS

| | | | | | |
|---|---|---|---|---|---|
| 2,462,976 | A | * | 3/1949 | King | 24/276 |
| 2,821,768 | A | * | 2/1958 | Beckham et al. | 24/276 |
| 2,937,834 | A | * | 5/1960 | Orenick et al. | 248/71 |
| 3,141,688 | A | * | 7/1964 | Taylor, Jr. et al. | 403/344 |
| 3,177,542 | A | * | 4/1965 | James | 24/115 R |
| 3,269,680 | A | * | 8/1966 | Bryant | 248/73 |
| 3,530,550 | A | * | 9/1970 | White | 24/464 |
| 3,550,219 | A | * | 12/1970 | Van Buren, Jr. | 248/73 |
| 4,237,995 | A | * | 12/1980 | Pivar | 180/210 |
| 4,286,642 | A | * | 9/1981 | Keatley | 411/112 |
| 4,455,716 | A | * | 6/1984 | Leonardo | 24/115 A |
| 4,489,973 | A | | 12/1984 | Willey | |
| 4,863,129 | A | * | 9/1989 | Adams | 248/206.2 |
| 5,113,553 | A | * | 5/1992 | Hutchinson | 24/464 |
| 5,599,148 | A | * | 2/1997 | Hirose | 411/175 |
| 5,816,543 | A | * | 10/1998 | Kraus | 248/73 |
| 5,871,319 | A | * | 2/1999 | Schneider | 411/107 |
| 6,000,104 | A | * | 12/1999 | Mann | 24/274 R |
| 6,287,064 | B1 | * | 9/2001 | Jhumra et al. | 411/175 |
| 6,305,054 | B1 | * | 10/2001 | Imes et al. | 24/276 |
| 6,431,585 | B1 | * | 8/2002 | Rickabus et al. | 280/728.3 |
| 6,666,415 | B2 | * | 12/2003 | Hansen | 248/74.3 |
| 6,974,175 | B2 | * | 12/2005 | Willey | 296/78.1 |
| 7,044,530 | B1 | | 5/2006 | Hahne | |
| 7,115,816 | B2 | * | 10/2006 | Barmore | 174/135 |
| 7,370,878 | B2 | * | 5/2008 | Nakazawa | 280/728.2 |
| 7,784,857 | B2 | * | 8/2010 | Naik et al. | 296/193.1 |

OTHER PUBLICATIONS

Wikipedia definition of "Side by Side (UTV)," retrieved from http://en.wikipedia.org/wiki/Side_by_Side(UTV), last modified Jul. 7, 2010, 1 page.
Recreational of-Highway Vehicle Association, "ROV Safety Rules," 2008, 1 page.
utvguide.net, "News-Tech-Reviews," 2010, Crowley Offroad LLC, 20 pages.
Wikipedia definition of "Thermoplastic polyurethanes," retrieved from http://en.wikipedia.org/wiki/ Thermoplastic_polyurethanes, last modified Jun. 15, 2010, 3 pages.

* cited by examiner

*Primary Examiner* — Terrell McKinnon
*Assistant Examiner* — Michael McDuffie
(74) *Attorney, Agent, or Firm* — Vedder Price P.C.

(57) ABSTRACT

A clamp, assembly and method for connecting a panel to a vehicle including longitudinally opposed end portions that are initially snap-fit in a loose slip-fit orientation to a vehicle support in order to adjustably fit the panel and finally coupled in a non-slip-fit orientation about a periphery of the contour of the vehicle support to fix the panel.

18 Claims, 8 Drawing Sheets

US 8,616,507 B2

PANEL MOUNTING ASSEMBLY

FIELD OF THE DISCLOSURE

The present disclosure relates to methods and an assemblies for connecting a panel to a vehicle.

BACKGROUND

It is often desirable to install a windshield on a side-by-side off-road vehicle, commonly referred to as a utility task vehicle ("UTV") or a recreational off-highway vehicle ("ROV") to provide additional protection and comfort for the 2-4 passengers. Fun, functional and definitely versatile, a UTV/ROV is a new type of vehicle, attracting the attention of outdoor enthusiasts in increasing numbers. When adventure calls, a UTV/ROV is useful for transporting gear to a favorite campsite or simply exploring the great outdoors. Intended primarily for recreational use, a UTV/ROV has also carved a niche in the workplace, including farming, construction, and just about anywhere there's a job to be done.

A UTV/ROV is a motorized off-road vehicle designed to travel on four or more non-highway tires, with a steering wheel, non-straddle seating, seat belts, an occupant roll over protection structure ("ROPS"), and usually engine displacement up to approximately 1,000 cc. Current models are designed with seats for a driver and one or more passengers. Notable manufacturers and models of UTV/ROV include: Arctic Cat (Prowler); Club Car (XRT1550); Cub Cadet; Honda (Big Red); Husqvarna; John Deere (Gator HPX XUV); Kawasaki (Mule, Trans, Teryx); Kubota (RTV1100, RTV900, RTV500); Polaris (Ranger, Ranger Crew, Ranger RZR); and Yamaha (Rhino) The majority of UTV/ROV come factory equipped with a ROPS generally in the form of roll bar-type of support structure configured from tubular steel, that may be round, square or have another suitable contour. Many of the vehicles also come with hard tops, windshields and even cab enclosures, primarily attached to the ROPS.

Accordingly, a number of techniques have been developed for installing a windshield to the ROPS. For example, FIG. 13 illustrates a conventional clamp assembly 10 for such an installation. One of skill in the art will recognize that the clamp 10 includes a strap 12 preformed to match or be complementary to the contour of the support structure, in this example, a substantially circular contour, an over-lay or over-mold of a thin elastomeric material 11, such a rubber or a like polymer, on the strap 12, and a fastener assembly 14, in this example, including a bolt 16, washer 18 and nut 20. The elastomeric material 11 functions to cushion the vibrations transmitted from the ROPS in an attempt to reduce cracking of the conventional polycarbonate windshield material. In another example, FIG. 14 illustrates another clamp assembly 30 for such an installation. One of skill in the art will recognize that the clamp 30 in this example is substantially similar to the clamp 10 in FIG. 13, except the fastener assembly and in particular the nut is different. In this example, the nut is configured as a conventional shoulder nut 32 having a hex head 34 and a tubular shaft 36, on which a grommet 38 is disposed to provide additional cushioning for the windshield in an attempt to further reduce the chances of cracking.

In order to install a windshield with either of the above conventional clamp assemblies, all of the clamp assembly straps for a given windshield, usually 8-10, are fitted to the ROPS without the fastener assembly 14. Then the windshield is positioned over the front window opening and the fastener assembly 14 (bolt, washer and nut) must be then fitted to each clamp assembly 10 or 30 individually and then tightened accordingly.

However, these conventional assemblies and installation techniques suffer from a number of drawbacks. For example, when the straps are fitted to the ROPS without the fastener assembly, as must happen by virtue of the conventional designs, the straps will not remain in a desired position (i.e., where the straps will be disposed after the final assembly). In fact, after sliding the straps over the ROP, the straps slide down to and gather at the bottom of the ROPS. Then, the installer must reposition each strap to the desired position during the installation process in order to begin to attach the windshield. This process not only increases the time of installation, but with the bulky nature of the windshield, also requires two installers to manage holding the windshield and fitting the fastener assemblies. Additionally, the installers must use tools on each side of the windshield in order to tighten the fastener assembly to fix the clamp assembly. Moreover, the straps must be pre-formed to the contour of the given ROPS and are not a universal fit for the contours of various different support structures.

Accordingly, there exists a need for improved methods and assemblies for connecting a panel to a vehicle.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF THE PREFERRED EMBODIMENTS

Figure 1:
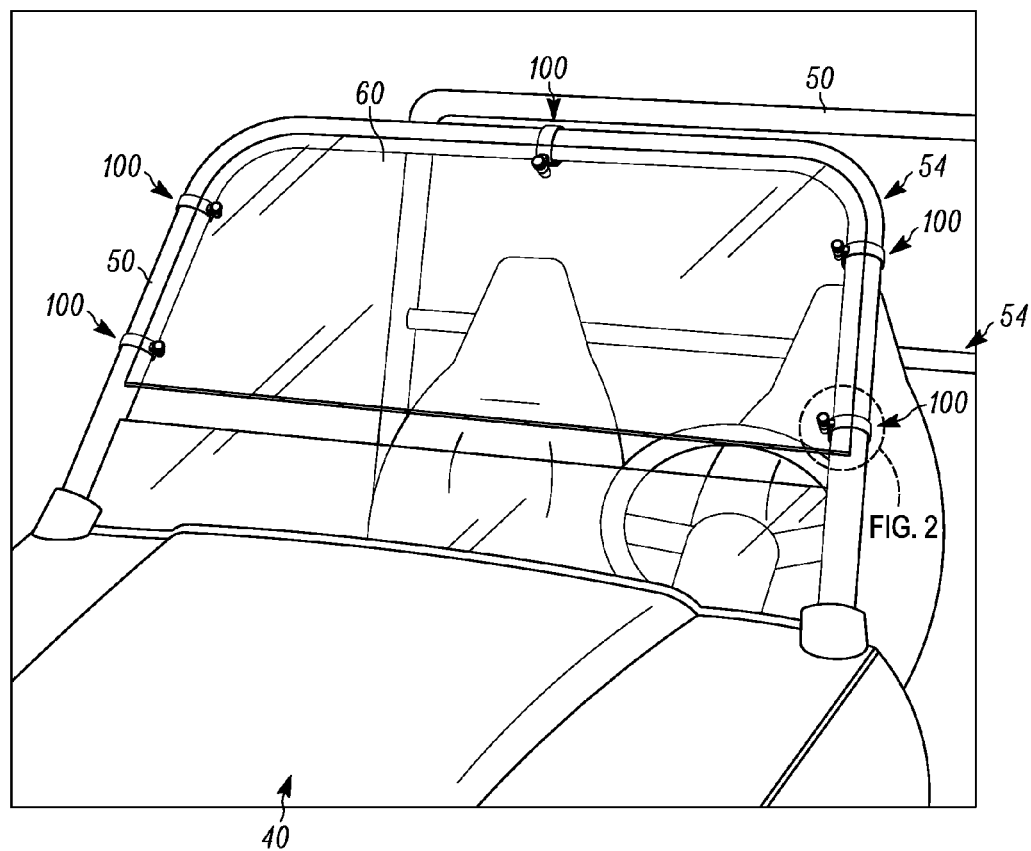
FIG. 1 is perspective view of a panel, in the form of a windshield, connected to a UTV/ROV by assemblies and in accordance with methods of the present disclosure.

The present disclosure provides methods and assemblies for connecting a panel to a vehicle. In one example, the methods include wrapping a strap portion of a clamp about a periphery of a contour of a support structure of the vehicle.

These methods may further include coupling the end portions of the clamp in a snap-fit connection such that the clamp is disposed in a loose slip-fit orientation about the support structure. These methods may still further include connecting the panel to a pin, or coupling the pin to one of the end portions. These methods may additionally include drawing the end portions toward one another such that the strap portion is disposed in a substantially contiguous non-slip-fit orientation about the periphery of the contour of the support structure.

In another example of the above methods, the clamp may be adjusted to a desired position on the support structure when disposed in the loose slip-fit orientation. In yet another example, clamp may be immovable on the support structure when disposed in the non-slip-fit orientation. In still another example, one end portion may include a projection having a distal end and an annular ring and the other end portion may include a receptacle having a deflectable lip disposed about an opening, and wherein the annular ring may have an outer diameter greater than an inner diameter of the deflectable lip so that the end portions may be coupled in the snap-fit connection. In yet still another example, the end portions each may have a longitudinal axis disposed to define an acute angle with respect to the strap portion. In a still further example, a through-bore may extend through the projection and a portion of the through-bore may include a non-cylindrical contour configured to couple a complementary contour of the pin. In a yet still further example, one end portion may have a generally tubular configuration and may include a pocket disposed to engage the fastener such that the receptacle and the pocket are defined by a common interior wall. In another example, the periphery of the contour of the support structure is non-circular.

Assemblies for connecting a panel to a vehicle in accordance with the present disclosure are also disclosed. The assemblies may include a clamp that may have a strap portion with end portions that may couple in a snap-fit connection such that the clamp is disposed in a loose slip-fit orientation about a support structure of the vehicle. These assemblies may also include a pin coupled to one of the end portions and adapted for connection to the panel. These assemblies may also include a fastener that may be inserted through one of the end portions to engage the pin and draw the end portions toward one another such that the strap portion is disposed in a non-slip-fit orientation connection about a periphery of a contour of the support structure.

In another example of the above assemblies, one of the end portions may include a projection having an annular ring and the other end portion may include a receptacle having a deflectable lip disposed about an opening, and wherein the annular ring may have an outer diameter greater than an inner diameter of the deflectable lip so that the end portions may be coupled in the snap-fit connection. In yet another example, the end portions each may have a longitudinal axis disposed to define an acute angle with respect to the strap portion. In still another example, a through-bore may extend through the projection and a portion of the through-bore may include a non-cylindrical contour configured to couple a complementary contour of the pin. In still yet another example, one end portion may have a generally tubular configuration and may include a pocket disposed to engage the fastener such that the receptacle and the pocket are defined by a common interior wall. In another example, the periphery of the contour of the support structure is non-circular.

Clamps for connecting a panel to a vehicle are also disclosed. These clamps may include a strap portion that may have end portions disposed at opposite longitudinal extents of the strap portion. These clamps may also include one end portion including a projection that may have a lateral element disposed on the. These clamps may further include one of the end portions that may include a receptacle having a deflectable element disposed adjacent an opening to the receptacle, wherein the lateral element may define an effective outer diameter that may be greater than an effective inner diameter defined by the deflectable element such that the end portions may be coupled in a snap-fit connection when the deflectable element is passed over the lateral element.

In another example of the above clamps, the end portions each may have a longitudinal axis disposed to define an acute angle with respect to the strap portion. In yet another example, a through-bore may extend through the projection and a portion of the through-bore may include a non-cylindrical contour. In still another example, one of the end portions may have a tubular configuration and may include a pocket disposed opposite the receptacle such that the receptacle and the pocket are defined by a common interior wall. In another example, the lateral element may be a segmented annular ring. In another example, the deflectable element may be a lip disposed about the opening to the receptacle.

Among other advantages, the disclosed assemblies and methods for connecting a panel to a vehicle provide increased installation efficiency and universal application. Specifically, the disclosed assemblies and methods provide installation efficiency by a snap-fit connection for a slip-fit orientation, an indexing contour connection that facilitates single tool affixing and a strap configured from an elastomer that may be disposed in a substantially contiguous non-slip-fit orientation about the periphery of the contour of the support structure, generally regardless of the configuration of the contour. The slip-fit orientation may be characterized in that once the end portions of the strap are so coupled by the snap-fit connection, the strap will generally remain in the desired position for installation of the panel, but may be adjusted with simple hand pressure by the installer (i.e., the installer placing a hand immediately above or below the strap will move the strap in the intended direction with only minimal resistance). This facilitates quicker installations as a result of the position efficiency. One of the end portions of the strap and a pin have complementary contours that may engage in a friction-fit connection to couple the pin to such end portion and also enable the installer to use a single tool (e.g., screwdriver, allen wrench, etc.) from one side of the windshield (e.g., inside the cab of the vehicle) to draw the strap end portions together. The strap is universal for circular and non-circular support structure contours which decreases manufacturing costs and does not require pre-forming which increases such costs. Other advantages will be recognized by those of ordinary skill in the art.

Figure 2:
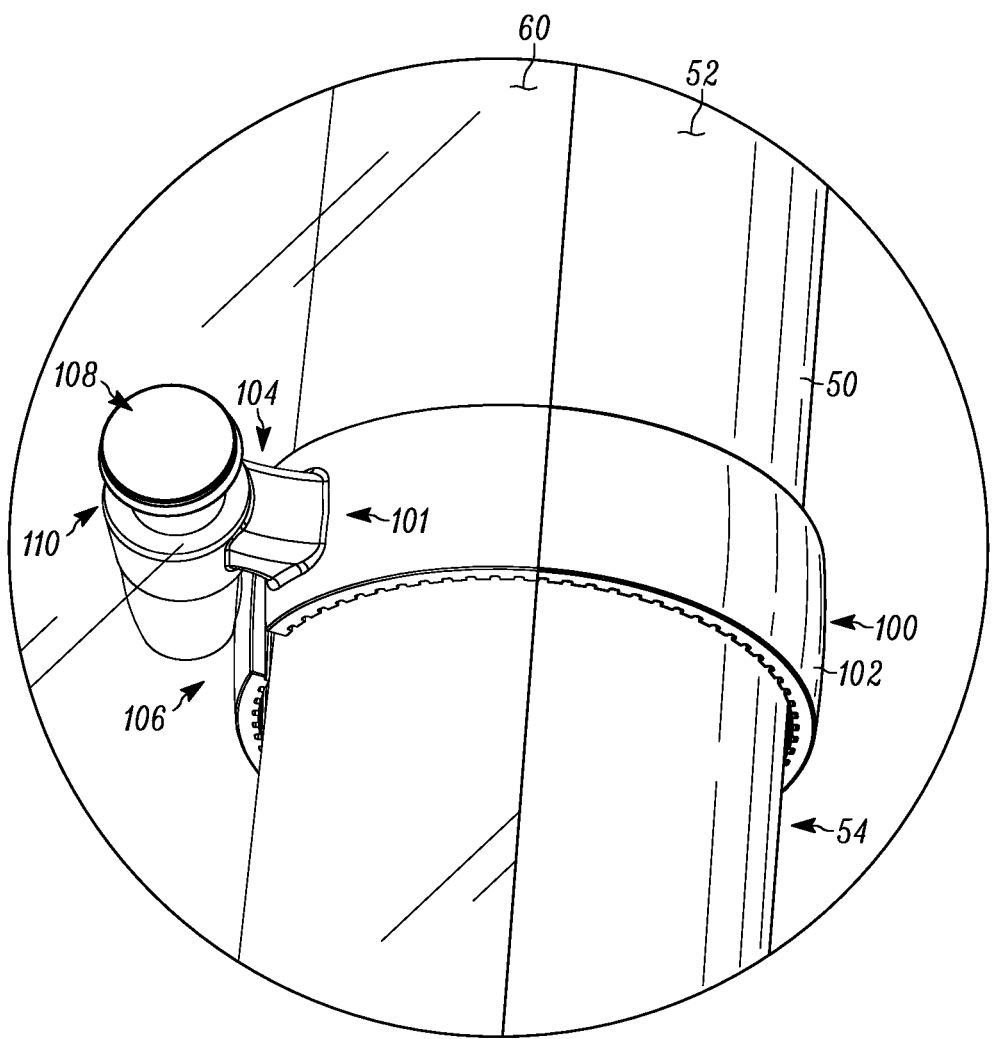
FIG. 2 is detailed view of a highlighted portion of FIG. 1 illustrating the assemblies for connecting a panel to a vehicle in accordance with the present disclosure.
Figure 12:
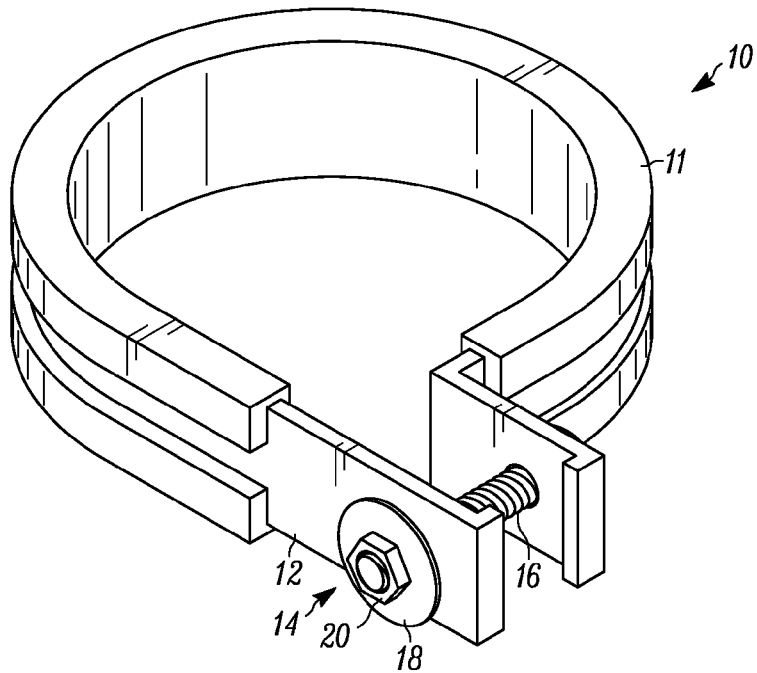
FIG. 12 is conventional prior art clamp assembly.
Figure 13:
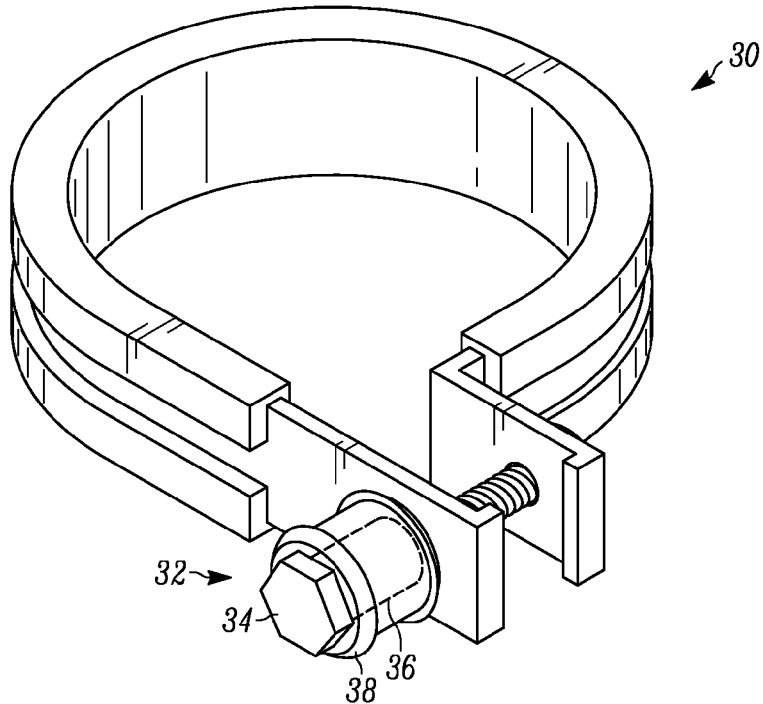
FIG. 13 is another conventional prior art clamp assembly.

The following description of the embodiments is merely exemplary in nature and is in no way intended to limit the disclosure, its application, or uses. FIG. 1 illustrates a panel 60, in the form of a windshield in this embodiment, connected to a vehicle 40, a UTV/ROV in this embodiment, by assemblies 100 and in accordance with methods of the present disclosure. In this embodiment, the assemblies 100 are connected to a support structure 50 of the vehicle 40. It is within the teachings of the present invention that the panel 60 may have any suitable configuration or purpose. For example, the panel 60 may be configured or used as an exterior or interior body panel, hood, trunk, door, window or any other suitable panel-like element. Likewise, the support structure 50 may have any suitable configuration or purpose. For example, in the present embodiment of FIG. 1, the UTV/ROV 40 has support structure 50 primarily configured as roll-over protection having a round cylindrical contour 54 wherein a periphery 52 about the contour 54 describes a circular shape. In other embodiments, such as shown in FIG. 12, the support structure 50 may have a square cylindrical contour 54 wherein a periphery 52 about the contour 54 describes a non-circular shape commonly referred to as a square. It is further within the teachings of the present disclosure that the support structure may have any suitable circular or non-circular contour 54 to which the assemblies 100 may be connected in accordance with the present disclosure FIG. 2 is detailed view of a highlighted portion of FIG. 1 illustrating the assemblies 100 for connecting the panel 60 to the vehicle 40 in accordance with the present disclosure. The assembly 100 of this embodiment is disposed in a substantially contiguous non-slip-fit orientation connection about the periphery 52 of the contour 54 of the support structure 50. In one embodiment, the assemblies 100 may include a clamp 101 that may have a longitudinally extending strap 102 that may include a first end portion 104 and a second end portion 106. The first and second end portions 104, 106 may be disposed at opposite longitudinal extents of the strap portion 102, or otherwise, as may be desirable, such as, for example, further mounting of additional elements. In one embodiment, a pin 108 may be connected to one of the end portions 104, 106. The pin 108 may include a vibration-reducing element, such as, for example, a grommet that may be formed of a rubber-like material that facilitates mounting of the panel as described below.

Figure 3:
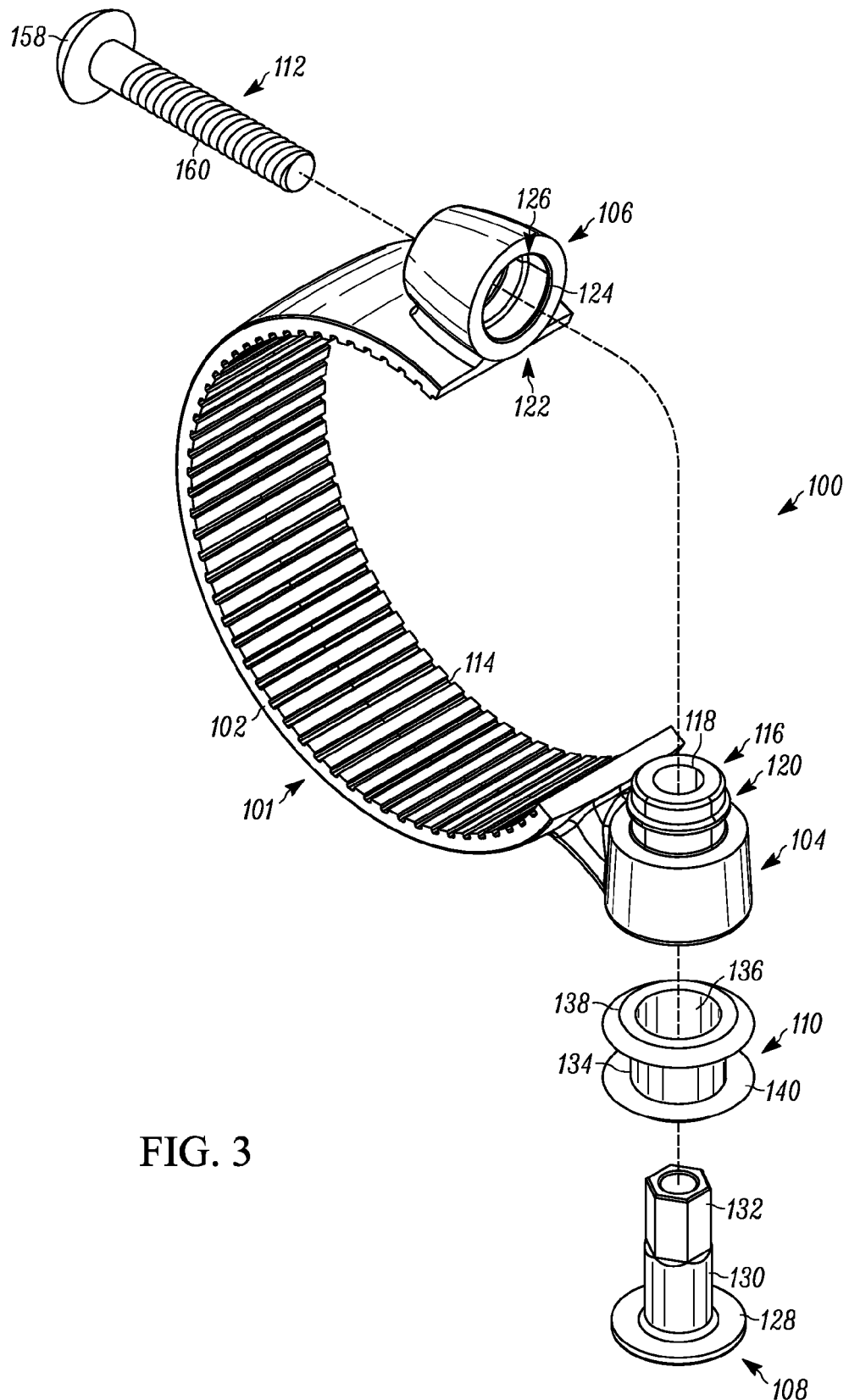
FIG. 3 is an exploded perspective view of the assembly illustrated in FIG. 2.

FIG. 3 is an exploded perspective view of the assembly 100 illustrated in FIG. 2. In one embodiment, the assembly 100 may include the clamp 101, the pin 108 and a fastener 112. The longitudinally extending strap portion 102 of the clamp 101 may include a plurality of laterally extending grooves 114 or other like formations. For example, the inner surface of the strap portion 102 may be configured with what is commonly referred to as a crenellated surface of flattened peaks and valleys in order to facilitate engagement in the slip-fit orientation and non-slip-fit orientation with respect to the support structure as described herein. One of ordinary skill in the art will recognize that such a configuration provides significant advantages over the prior art in terms of flexibility and conformability of the strap portion 102. Additionally, in one of the preferred embodiments, the clamp 101 may be formed from an elastomeric material, such as, for example only, a thermoplastic polyurethane ("TPU") that has excellent abrasion resistance, outstanding low-temperature performance, excellent mechanical properties combined with a rubber-like elasticity, very good tear strength, high elasticity, and good oil and grease resistance. Preferably, the TPU may be polyester- or polyether-based. It is within the teachings of the present disclosure that other like materials may be used to provide similar results.

In one embodiment, the first end portion 104 may include a projection 116 having a distal end 118 and a lateral element 120 disposed on the projection 116 between the distal end 118 and the strap portion 102. The second end portion 106 may include a receptacle 122 that may have a deflectable element 124 disposed adjacent an opening 126 to the receptacle 122. As described in more detail below, it is within the teachings of the present disclosure that the foregoing structural elements associated with the first end portion 104 may have any suitable configuration. For example, the first end portion 104 may have a generally barrel-shaped configuration from which the projection 116 extends.

In another embodiment, the pin 108 may be coupled to the first end portion 104 and adapted for connection to the panel 60. The pin 108 may include an enlarged head portion 128, a proximate shaft portion 130 and a distal shaft portion 132. In one embodiment, the proximate shaft portion 130 may have a cylindrical peripheral contour or any other suitable shape to facilitate engagement with the grommet 110, as described below. Still further, the proximate shaft portion 130 and enlarged head portion 128 may be configured to facilitate a pivotal or otherwise movable connection between the panel 60 and the pin 108, such as, for example, when mounting a doo, hood, trunk, sun roof or other like element to the vehicle. In another embodiment, the distal shaft portion 132 may have a non-cylindrical contour. For example, in one embodiment, the distal shaft portion 132 may be configured with a hexagonal contour. One of ordinary skill in the art will recognize that any other non-cylindrical contour may be freely substituted therefore provided that the intended functionality of minimizing relative rotation between the pin 108 and the first end portion 104 is maintained. Preferably, the distal shaft portion 132 contour is complementary to the contour of the first end portion 104, as described herein. As will be described in more detail below, the coupling of the pin 108 to the first end portion 104 may be by a friction-fit connection to provide the intended anti-rotation functionality.

The grommet 110 may include any conventional configuration, such as, for example only, a central tube 134 that defines an axially extending opening 136 and a pair of end flanges 138, 140. One of ordinary skill in the art will recognize that the grommet 110 is useful to securely mount the panel 60, for protecting the opening in the panel 60 and for reducing vibration, abrasion and strain of the panel 60 and the pin 108. It is within the teachings of the present disclosure that any suitable material or configuration of the grommet may be used to provide the intended functionality.

In one embodiment, the fastener 112 may be inserted through the second end portion 106 to engage the pin 108 and draw the first and second end portions 104, 106 toward one another such that the strap portion 102 is disposed in a substantially contiguous non-slip-fit orientation about a periphery 52 of a contour 54 of the support structure 50, as described herein. It is within the teachings of the present disclosure that the fastener may have any suitable configuration to provide the intended functionality. For example, in this embodiment, the fastener 112 is configured as a conventional threaded fastener commonly referred to as a screw or bolt having a head portion 158 and a spiral or helix fluted portion 160 extending therefrom.

Figure 4:
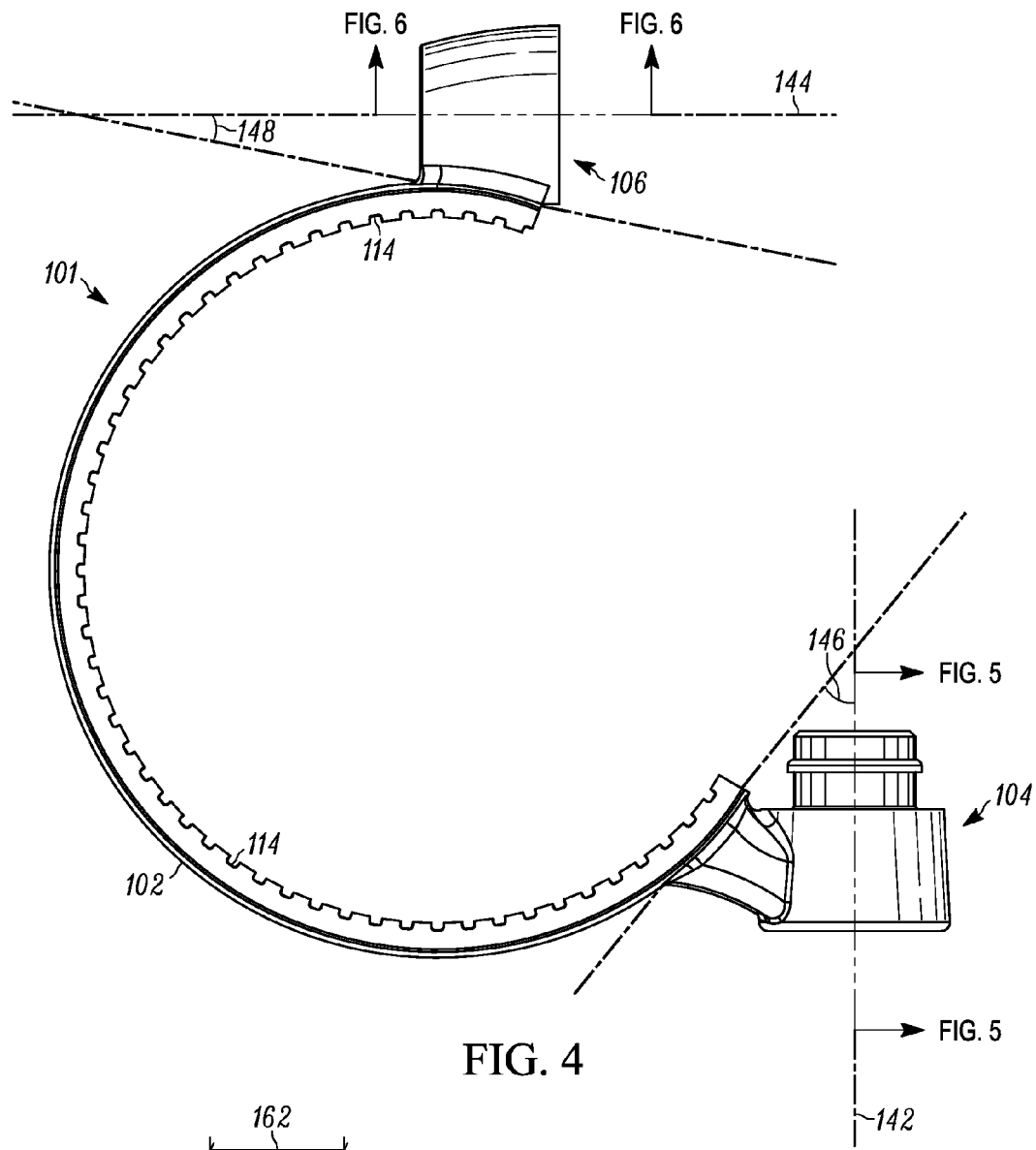
FIG. 4 is a side elevation view of a clamp of the assembly illustrated in FIG. 2.

FIG. 4 is a side elevation view of a clamp 101 of the assembly 100 illustrated in FIG. 2. In this embodiment, the longitudinally extending strap portion 102 of the clamp 101 includes the plurality of laterally extending grooves 114 to define a crenellated inner surface having a series of flattened peaks and valleys, the first end portion 104 and the second end portion 106. Each of the first and second end portions 104, 106 may include a respective longitudinal axis 142, 144 that are each disposed to define a respective acute angle 146, 148 with respect to the strap portion 102. It is within the teachings of the present disclosure that the acute angle is not limited to a specific range, but rather is preferably any acute angle that provides the functionality of facilitating ease of connecting the panel 60 to the support structure 50 of the vehicle 40. In one embodiment, a preferred range may be 22°-52° and a more preferred range may be 32°-42°

Figure 5:
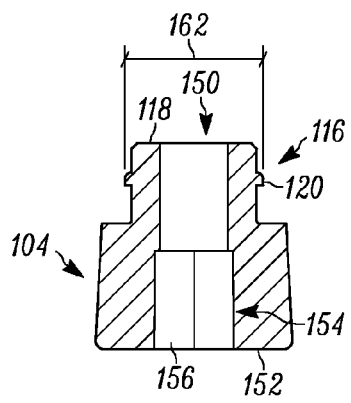
FIG. 5 is cross-sectional view of an end portion of the clamp illustrated in FIG. 4 taken along line 5-5.
Figure 7:
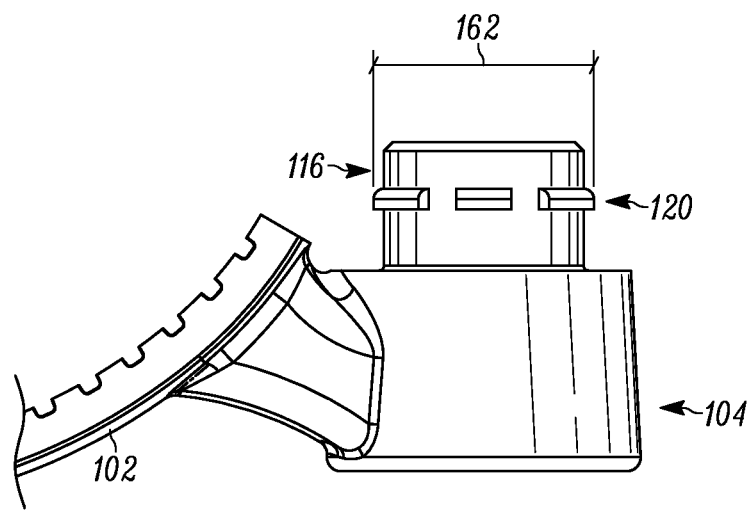
FIG. 7 is another embodiment of an end portion of the clamp illustrated in FIG. 4.

FIG. 5 is cross-sectional view of the first end portion 104 of the clamp 101 illustrated in FIG. 4 taken along line 5-5. In this embodiment, the first end portion 104 includes the projection 116 having a distal end 118 and a lateral element 120 disposed on the projection 116 between the distal end 118 and the strap portion 102. It is within the teachings of the present disclosure that the lateral element 120 may have any suitable configuration to provide the intended functionality. For example, in one embodiment, the lateral element 120 may be configured as an annular ring (see FIGS. 3-5), a segmented annular ring (see FIG. 7, which is another embodiment of an end portion of the clamp illustrated in FIG. 4) or any other suitable configuration, such as hook-like formations or the like. FIG. 7 illustrates the first end portion 104 connected to the strap portion 102 wherein the segmented annular ring is disposed on the projection 116 to function as the lateral element 120 as described herein. It is within the teachings of the present disclosure that any suitable configuration of the lateral element 120 may be provided to facilitate the intended functionality. For example, the segmented annular ring or other discontinuous lateral element feature, such as a single hook or the like, may reduce insertion force or provide other additional functionality.

Figure 8:
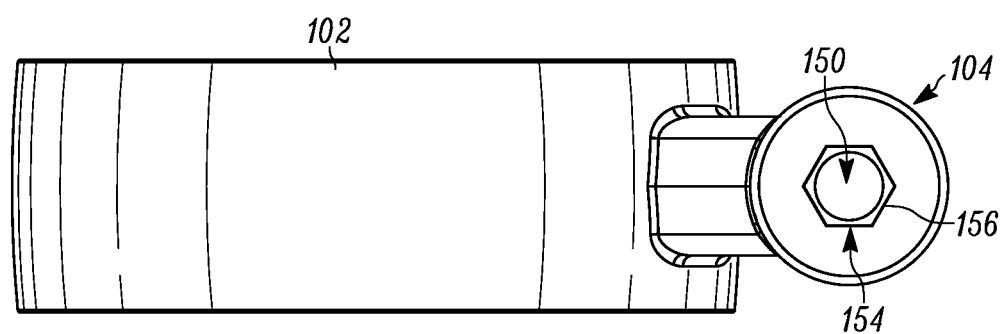
FIG. 8 is bottom plan view of the clamp illustrated in FIG. 4.

The first end portion 104 may also include a first through-bore 150 that extends through the projection 116 from the distal end 118 to a proximate end 152 adjacent the strap portion 102. In one embodiment, a near portion 154 of the first through-bore 150 disposed adjacent the proximate end 152 may include a non-cylindrical contour 156. For example, in this embodiment, the non-cylindrical contour 156 is configured as a hexagonal contour. One of ordinary skill in the art will recognize that any other non-cylindrical contour may be freely substituted therefore provided that the intended functionality of minimizing relative rotation between the pin 108 and the first end portion 104 is maintained. FIG. 8 is bottom plan view of the clamp illustrated in FIG. 4 that illustrates the first end portion 104 connected to the strap portion 102 and the first through-bore 150 formed in the first end portion 104 wherein the near portion 154 is configured with a non-cylindrical contour 156 formed as a hexagon to be coupled to the pin 108, having a complementary contour, by a friction-fit connection.

In one embodiment, the lateral element 123 defines an effective outer diameter 162 (see FIGS. 5 and 7). It is within the teachings of the present disclosure that the effective outer diameter 162 may be in part defined by the projection 116 in the event that the lateral element 120 may have a discontinuous configuration.

Figure 6:
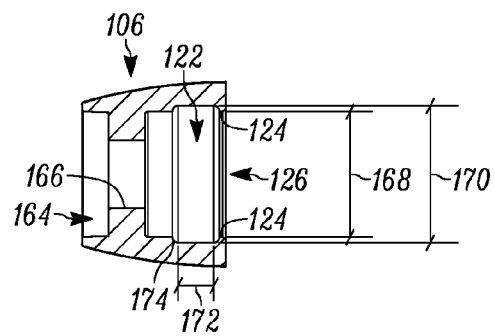
FIG. 6 is cross-sectional view of another end portion of the clamp illustrated in FIG. 4 taken along line 6-6.

FIG. 6 is cross-sectional view of the second end portion 106 of the clamp 102 illustrated in FIG. 4 taken along line 6-6. In this embodiment, the second end portion 106 includes a receptacle 122 that may have a deflectable element 124 disposed adjacent an opening 126 to the receptacle 122. In one embodiment, the second end portion 106 may have a generally tubular configuration of its exterior surface. However, it is within the teachings of the present disclosure that the configuration of the exterior surface may have any suitable configuration to provide the intended functionality, such as square, hexagonal or the like. In another embodiment, the second end portion 106 may include a pocket 164 disposed opposite the receptacle 122 such that the receptacle 122 and the pocket 164 are defined by a common interior wall 166. In another embodiment, the deflectable element 124 defines an inner diameter 168 that is preferably less than the effective outer diameter 162 of the lateral element. In another embodiment, the first end portion 104 is loosely coupled to the second end portion 106 in a snap-fit connection when the deflectable element 124 is passed over the lateral element 120. One of ordinary skill in the art will recognize that the effective outer diameter 162 is generally approximately similar in dimension to the interior diameter 170 of the receptacle 122, which is also larger than the inner diameter 168. As a result, the snap-fit connection results when the lip 124 deflects as being passed over the lateral element 120 and returns to a normal position, as shown in FIG. 6, when the lateral element 120 is disposed within the receptacle 122 and retained therein by the lip 124, as described herein. The coupling described above is loose because the lateral element 120 is movable within the receptacle 122 a distance 172 defined between the lip 124 and a shoulder 174, and also because the clamp 101 is disposed in a loose slip-fit orientation about the support structure 50 of the vehicle 40, as described herein.

Figure 9:
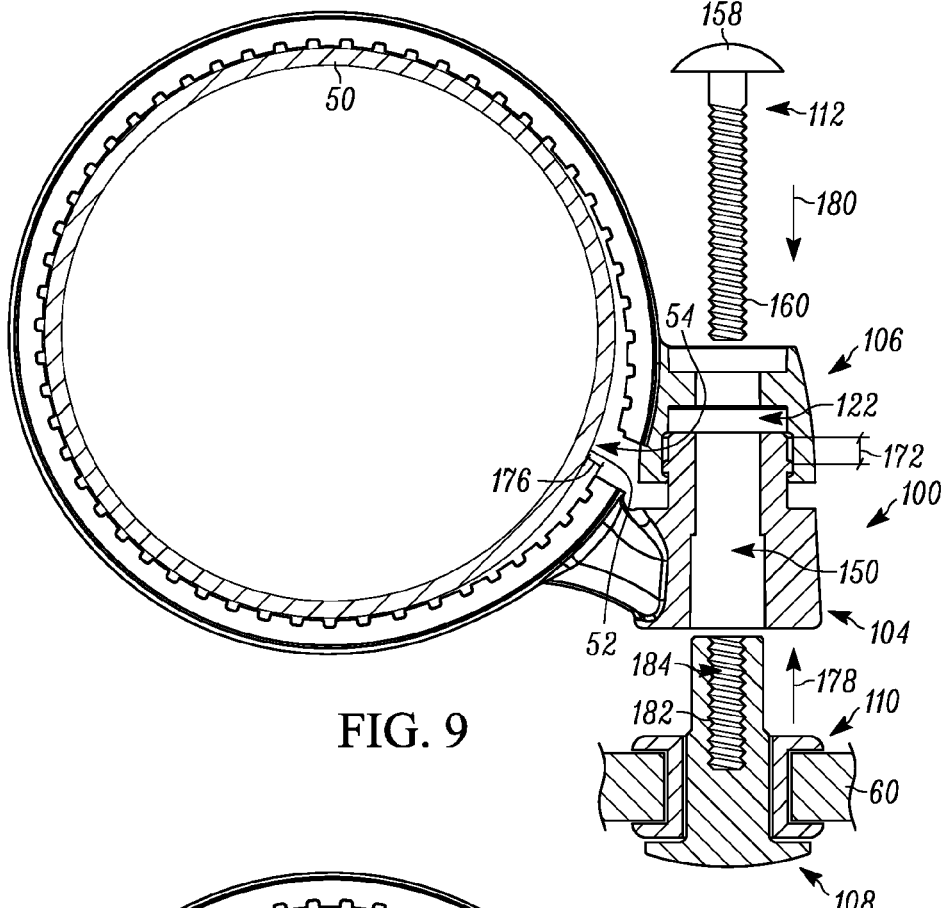
FIG. 9 is a top view of assemblies and methods for connecting a panel to a vehicle in accordance with the present disclosure, where a support structure is illustrated in cross-section.

FIG. 9 is a top view of assemblies 100 and methods for connecting the panel 60 to the vehicle 40 in accordance with the present disclosure, where the support structure 50 is illustrated in cross-section. In one embodiment of a method for connecting a panel 60 to a vehicle 40, the method may include wrapping a longitudinally extending strap portion 102 of a clamp 101 about a periphery 54 of a contour 52 of a support structure 50 of the vehicle 40. The method may also include coupling a first end portion 104 and a second end portion 106 of the clamp 101 in a snap-fit connection such that the clamp 101 is disposed in a loose slip-fit orientation about the support structure 50. It is within the teachings of the present disclosure that the loose slip-fit orientation shall be construed broadly such that when the clamp 101 is disposed in the loose slip-fit orientation there is a space or gap 176 defined between the strap portion 102 and the support structure 50 and the clamp 101 may be moved axially with respect to the support structure 50 (i.e., in or out of the drawing page or along the longitudinal axis of the support structure 50) by the installer's hand without tools to a desired position on the support structure 50. Additionally, the first end portion 104 may be moved relative to the second end portion 106 the distance 172 to facilitate the slip-fit orientation as desired.

In another embodiment, the method may include connecting the panel 60 to the pin 108. This embodiment may include connecting or securing a grommet 110 to the panel 60 then inserting the pin 108 through the grommet 110. In another embodiment, the method may include coupling the pin 108 to the first end portion 104, as described herein such as, by a friction-fit connection in one embodiment. As shown in FIG. 9, the pin 108 is moved in the direction of arrow 178.

Figure 10:
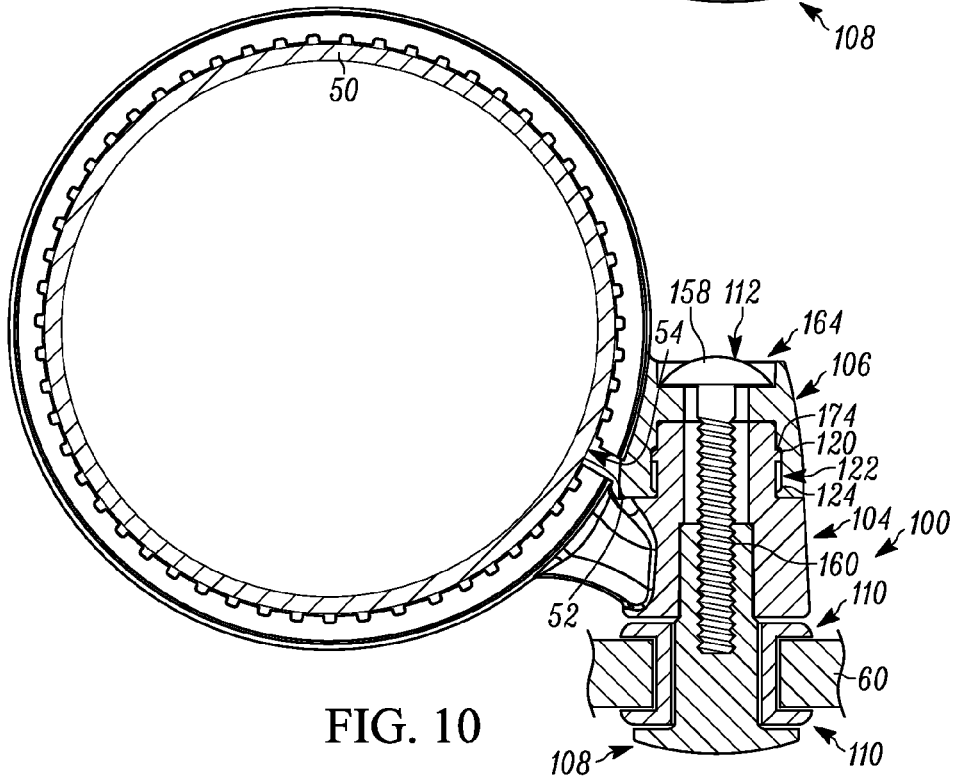
FIG. 10 is a top view of further assemblies and methods illustrated in FIG. 9.
Figure 11:
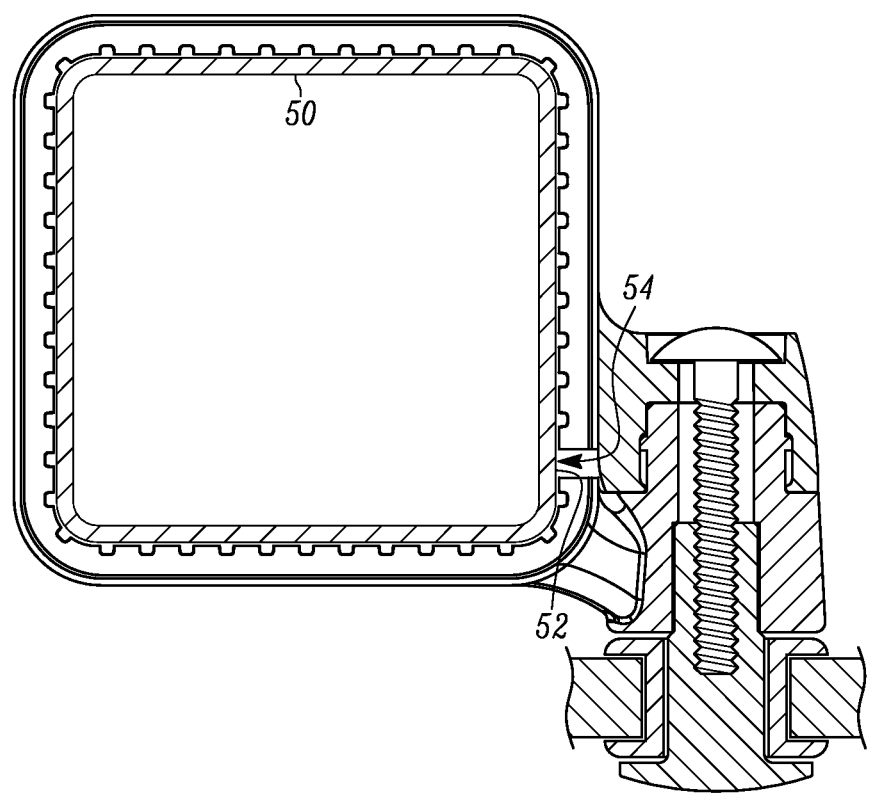
FIG. 11 is similar to FIG. 10 but for the support structure having a different contour.

In another embodiment, the method may include inserting the fastener 11 through the second end portion 106 in the direction of arrow 180 and engaging the pin 108 to draw the first and second end portions 104, 106 toward one another (i.e., arrows 178 and 180), such that the pin 108 is fully seated in the first through-bore 150 and the lateral element 120 abuts the shoulder 174 (i.e., remote from the lip 124 within the receptacle 122) so that the strap portion is disposed in a substantially contiguous non-slip-fit orientation about the periphery 54 of the contour 52 of the support structure 50, as shown in FIG. 10. In this embodiment, the head portion 158 of the fastener 112 is seated in the pocket 164 so that rotation of the fastener 112 causes the threaded portion 160 of the fastener 112 to engage the interior surface 182 of a bore 184 in the pin 108 that may be complementarily threaded or not if self-tapping threads are provided on the fastener 112. The substantially non-slip-fit orientation shall be construed broadly, but most notably, the space or gap 176 is substantially eliminated such that the clamp 101 is immovable on the support structure 50 when disposed in the non-slip-fit orientation. It is within the teachings of the present disclosure that the contour 52 of the support structure 50 may include any suitable configuration. For example, the contour 52 may be configured in cross-section as a square, as shown in FIG. 11, or any other suitable shape.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A clamp for connecting a panel to a vehicle, said clamp comprising:
   a longitudinally extending strap portion including a first end portion and a second end portion, the first and second end portions disposed at opposite longitudinal extents of the strap portion;
   the first end portion including a projection having a distal end and a lateral element disposed on the projection between the distal end and the strap portion, wherein a first extent is defined along the projection from the distal end to the lateral element; and
   the second end portion including a receptacle defined by an interior wall having a single deflectable element disposed adjacent an opening of the receptacle and a shoulder defined by the interior wall disposed within the receptacle spaced at a distance from the deflectable element, wherein the interior wall along the distance is continuously non-stepped and has a second extent greater than the first extent,
   wherein the lateral element defines an effective outer diameter that is greater than an effective inner diameter defined by the deflectable element such that; (a) when the distal end is inserted into the receptacle and the lateral element is passed over the deflectable element the first and second end portions are disposed in an initially loosely coupled configuration defined by: (1) the lateral element disposed immediately adjacent the deflectable element, and (2) the lateral element freely longitudinally movable along the distance without impediment; and (b) when the distal end is further inserted the distance into the receptacle the first and second end portions are disposed in a finally tightly coupled, and (2) the distal end firmly retained in the receptacle below the shoulder configuration defined by the lateral element disposed contiguous with the shoulder.

2. The clamp as recited in claim 1, wherein the first and second end portions each have a longitudinal axis disposed to permanently define an acute angle with respect to the strap portion.

3. The clamp as recited in claim 1, further comprising a first through-bore that extends through the projection from the distal end to a proximate end and a near portion of the first through-bore disposed adjacent the proximate end including a non-cylindrical contour.

4. The clamp as recited in claim 1, wherein the second end portion has a generally tubular configuration and further includes a pocket disposed opposite the receptacle such that the receptacle and the pocket are defined by a common interior wall.

5. The clamp as recited in claim 1, wherein the lateral element is a segmented annular ring.

6. The clamp as recited in claim 1, wherein the deflectable element is a lip disposed about the opening to the receptacle.

7. An assembly for connecting a panel to a vehicle, said assembly comprising:
   a clamp including a longitudinally extending strap portion having a first end portion and a second end portion, the first end portion including a projection having a distal end and a lateral element disposed on the projection between the distal end and the strap portion, wherein a first extent is defined along the projection from the distal end to the lateral element; and the second end portion including a receptacle defined by an interior wall having a single deflectable element disposed adjacent an opening of the receptacle and a shoulder defined by the interior wall disposed within the receptacle spaced at a distance from the deflectable element, wherein the interior wall along the distance is continuously non-stepped and has a second extent greater than the first extent, wherein the lateral element defines an effective outer diameter that is greater than an effective inner diameter defined by the deflectable element such that when the distal end is inserted into the receptacle and the lateral element is passed over the deflectable element the first and second end portions are disposed in an initially loosely coupled configuration defined by: (1) the lateral element disposed immediately adjacent the deflectable element, and (2) the lateral element freely longitudinally movable along the distance without impediment such that the clamp is disposed in a loose slip-fit orientation about a support structure of the vehicle;
   a pin removably coupled to the first end portion and adapted for connection to the panel; and
   a fastener inserted through the second end portion to engage the pin and draw the first and second end portions toward one another across the distance such that the first and second end portions are disposed in a finally tightly coupled configuration defined by the distal end further inserted the distance into the receptacle so that the lateral element is disposed contiguous with the shoulder and the strap portion is disposed in a substantially continuous contiguous non-slip-fit orientation connection about a periphery of a contour of the support structure.

8. The clamp as recited in claim 7, wherein the first and second end portions each have a longitudinal axis disposed to permanently define an acute angle with respect to the strap portion.

9. The clamp as recited in claim 7, further comprising a first through-bore that extends through the projection from the distal end to a proximate end and a near portion of the first through-bore disposed adjacent the proximate end including a non-cylindrical contour configured to couple a complementary contour of the pin.

10. The clamp as recited in claim 7, wherein the second end portion has a generally tubular configuration and further includes a pocket disposed opposite the receptacle to engage the fastener such that the receptacle and the pocket are defined by a common interior wall.

11. The clamp as recited in claim 7, wherein the periphery of the contour of the support structure is non-circular.

12. A method of connecting a panel to a vehicle comprising:
   wrapping a longitudinally extending strap portion of a clamp about a periphery of a contour of a support structure of the vehicle;
   coupling initially in a loose configuration a first end portion and a second end portion of the clamp, wherein the first end portion includes a projection having a distal end and a lateral element disposed on the projection between the distal end and the strap portion, wherein a first extent is defined along the projection from the distal end to the lateral element; and the second end portion includes a receptacle defined by an interior wall having a single deflectable element disposed adjacent an opening of the receptacle and a shoulder defined by the interior wall disposed within the receptacle spaced at a distance from the deflectable element, wherein the interior wall along the distance is continuously non-stepped and has a second extent greater than the first extent and wherein the lateral element defines an effective outer diameter that is greater than an effective inner diameter defined by the deflectable element such that when the distal end is inserted into the receptacle and the lateral element is passed over the deflectable element the first and second end portions are disposed in an initially loosely coupled configuration defined by: (1) the lateral element disposed immediately adjacent the deflectable element and (2) the lateral element freely longitudinally movable along the distance without impediment such that the clamp is disposed in a loose slip-fit orientation about said support structure, the first and second end portions disposed at opposite longitudinal extents of the strap portion;

connecting the panel to a pin;

coupling the pin to the first end portion;

drawing the first and second end portions toward one another across the distance with a fastener inserted through the second end portion and engaging the pin such that the first and second end portions are disposed in a finally tightly coupled configuration defined by the distal end further inserted the distance into the receptacle so that the lateral element is disposed contiguous with the shoulder and the strap portion is disposed in a substantially continuous contiguous non-slip-fit orientation about the periphery of the contour of the support structure.

13. The method as recited in claim 12, further comprising adjusting the clamp to a desired position on the support structure when disposed in the loose slip-fit orientation.

14. The method as recited in claim 12, wherein the clamp is immovable on the support structure when disposed in the non-slip-fit orientation.

15. The method as recited in claim 12, wherein the first and second end portions each have a longitudinal axis disposed to permanently define an acute angle with respect to the strap portion.

16. The method as recited in claim 12, further comprising a first through-bore that extends through the projection from the distal end to a proximate end and a near portion of the first through-bore disposed adjacent the proximate end including a non-cylindrical contour configured to couple a complementary contour of the pin.

17. The method as recited in claim 12, wherein the second end portion has a generally tubular configuration and further includes a pocket disposed opposite the receptacle to engage the fastener such that the receptacle and the pocket are defined by a common interior wall.

18. The method as recited in claim 12, wherein the periphery of the contour of the support structure is non-circular.

* * * * *